US012779762B2

(12) United States Patent
Cavallini et al.

(10) Patent No.: US 12,779,762 B2
(45) Date of Patent: Nov. 3, 2026

(54) POST-MOLDING COOLING APPARATUS FOR PREFORMS OR CONTRAINERS MADE OF THERMOPLASTIC

(71) Applicant: S.I.P.A. SOCIETA' INDUSTRIALIZZAZIONE PROGETTAZIONE E AUTOMAZIONE S.P.A., Vittorio Veneto (IT)

(72) Inventors: Franco Cavallini, Treviso (IT); Marco Frare, San Fior (IT); Marco Piai, Sacile (IT); Matteo Zoppas, Conegliano (IT)

(73) Assignee: S.I.P.A. SOCIETA' INDUSTRIALIZZAZIONE PROGETTAZIONE E AUTOMAZIONE S.P.A., Vittorio Veneto (IT)

( * ) Notice: Subject to any disclaimer, the term of this patent is extended or adjusted under 35 U.S.C. 154(b) by 649 days.

(21) Appl. No.: 18/258,438

(22) PCT Filed: Dec. 21, 2021

(86) PCT No.: PCT/IB2021/062060
§ 371 (c)(1),
(2) Date: Jun. 20, 2023

(87) PCT Pub. No.: WO2022/137097
PCT Pub. Date: Jun. 30, 2022

(65) Prior Publication Data

US 2024/0042670 A1 Feb. 8, 2024

(30) Foreign Application Priority Data

Dec. 24, 2020 (IT) ........................ 102020000032357

(51) Int. Cl.
*B29C 49/64* (2006.01)
*B29C 49/06* (2006.01)
(Continued)

(52) U.S. Cl.
CPC .......... *B29C 49/6427* (2013.01); *B29C 49/06* (2013.01); *B29C 49/062* (2013.01);
(Continued)

(58) Field of Classification Search
CPC ..... B29C 49/06; B29C 49/062; B29C 49/063; B29C 49/4205; B29C 49/42095;
(Continued)

(56) References Cited

U.S. PATENT DOCUMENTS 12,496,759 B2 * 12/2025 Cavallini ................ B29C 33/02
2017/0190094 A1 * 7/2017 Wu ..................... B29C 49/6427

FOREIGN PATENT DOCUMENTS

EP 3348377 A1 7/2018
WO 2013140326 A1 9/2013
WO 2015033273 A1 3/2015

OTHER PUBLICATIONS

International Search Report and Written Opinion issued in PCT application No. PCT/IB2021/062060, mailing date Apr. 4, 2023.

(Continued)

*Primary Examiner* — Xiao S Zhao
*Assistant Examiner* — Joseph S Leyson
(74) *Attorney, Agent, or Firm* — Benesch Friedlander Coplan & Aronoff LLP

(57) ABSTRACT

A rotary cooling apparatus for cooling preforms (P) made of thermoplastic material, comprising: —a carousel (1) defining a periphery thereof and adapted to rotate about a substantially vertical rotation axis; —at least one fixed guide element (6) arranged along at least part of said periphery; —a plurality of cooling devices (3) radially arranged along the periphery of the carousel, each cooling device (3) being adapted to substantially horizontally translate along a radial direction with respect to said rotation axis, and provided with a plurality of cooling tubes (4) arranged in sequence along said radial direction and adapted to receive a respective preform to be cooled; —a plurality of picking and releasing devices (5), each picking and releasing device (5) cooperating with a respective cooling device (3) and being
(Continued)

adapted to pick a preform from a transfer wheel, release said preform alternately into one of said cooling tubes (4) and pick said preform again to release it downstream of said rotary apparatus, said at least one picking and releasing device (5) being adapted to translate upwards or downwards transversely to said radial direction by cooperating with said at least one fixed guide element (6) during a rotation of the carousel (1).

8 Claims, 7 Drawing Sheets

(51) Int. Cl.

| | |
|---|---|
| ***B29C 49/42*** | (2006.01) |
| *B29K 67/00* | (2006.01) |
| *B29L 31/00* | (2006.01) |

(52) U.S. Cl.
CPC ...... *B29C 49/063* (2013.01); *B29C 49/42095* (2022.05); *B29C 49/6435* (2022.05); *B29K 2067/003* (2013.01); *B29L 2031/7158* (2013.01)

(58) Field of Classification Search
CPC .............. B29C 49/6427; B29C 49/643; B29C 49/6435; B29C 2949/0715
See application file for complete search history.

(56) References Cited

OTHER PUBLICATIONS

In PCT application No. PCT/IB2021/062060, mailing date Apr. 4, 2023.International Preliminary Report on Patentability issued Jun. 13, 2023.

* cited by examiner

POST-MOLDING COOLING APPARATUS FOR PREFORMS OR CONTRAINERS MADE OF THERMOPLASTIC

FIELD OF THE INVENTION

The present invention relates to a production plant for producing preforms or containers made of thermoplastic material, for example made of PET, and in particular to a cooling apparatus employed in said plants.

BACKGROUND ART

The production of a significant number of thermoplastic containers, in particular of bottles, is a process which starting from the raw material, which generally is polyethylene terephthalate or PET, allows obtaining finished containers having a shape—even a particularly complex shape—adapted to the most varied needs of the market and particularly lightweight and also resistant when subjected to strong pressures at room temperature.

The passage from PET in the raw state in the form of granules to plastic container can be achieved by choosing a single-stage process or a two-stage process.

The single-stage process is performed with a single production plant in which the passage from PET granules to preform by means of a mold injection step, and the passage from preform to plastic container by means of the stretch-blowing step, occurs continuously, without letting the preform completely cool to room temperature. Thereby, the preform still maintains part of the latent heat remaining from the injection step, with significant energy saving, because the preforms require less heat to then be brought back to the temperature suitable for blowing with respect to the case in which they are to be reheated starting from room temperature. Instead, a so-called "two-stage" process is performed in two generally, but not necessarily, separate plants: one production plant performs the first part of the production process of the containers with the passage from PET granules to preform, that is, it performs the injection step of the PET preforms into injection molds. The second part of the process, which transforms the preform into the final container in a blowing machine with the stretch-blowing technique, which is the one generally used today to blow PET containers, is performed in the other production plant. The two-stage process may also be performed in the same production plant, which provides injecting preforms and blowing the same into containers, but the two operations are performed at two separate times. The preforms are first cooled in special cooling plants up to reaching room temperature, to then be stored while waiting to be introduced into appropriate ovens to bring them back to the temperature required to perform the blowing process typical of the thermoplastic used or required for the stretch-blowing, in the event PET is used.

So-called stars comprising a rotatable wheel provided with a series of grippers having extendible arms equipped with jaws may be employed for transporting the preforms or final containers in plants consisting of rotary carousels. Certain problems concerning this type of production plant for producing PET preforms or containers relate to the need to provide an increased automation capability, increased reliability, an increase in the transfer speed of the preforms from one station to the other, the decrease in maintenance times, and above all the decrease in production times. In order to increase the production capacity of the preforms, there is a need to make use of highly automated systems, and there is a need to decrease the times the preforms remain in the molding modules and the times required for a first cooling of the preform to make it sufficiently solid on the outside so that it can be picked by the grippers of the transfer stars or wheels without the risk of deformation. Minimizing these times may result in the risk of the formation of crystallinity zones if a system for quickly transferring the preforms to an efficient cooling apparatus where the preform may be quickly brought back to room temperature, is not available. Therefore, the need is felt to make new plants with rotary machines for producing preforms or containers, in particular made of PET, in order to meet the market needs of increasing productivity. And therefore, for the reasons mentioned, also new and more efficient cooling plants are needed.

SUMMARY OF THE INVENTION

It is the object of the present invention to provide a rotary cooling apparatus for a production plant for producing thermoplastic preforms or containers, in particular PET, which solves the above-mentioned problems. One of these problems in particular relates to the cooling times of the preforms or containers, such as for example test tubes.

The solution is a rotary cooling apparatus which can be employed in production plants of preforms or containers, such as test tubes, with a high production speed, that is, a rotary cooling apparatus of preforms or containers made of thermoplastic material, in particular made of PET, which comprises:

- a carousel having a periphery thereof and adapted to rotate about a substantially vertical rotation axis X;
- at least one fixed guide element arranged along at least part of said periphery;
- a plurality of cooling devices radially arranged along the periphery of the carousel, each cooling device being adapted to substantially horizontally translate along a radial direction with respect to said rotation axis X, and provided with a plurality of cooling tubes arranged in sequence along said radial direction and adapted to each receive a respective preform to be cooled;
- a plurality of picking and releasing devices, each picking and releasing device cooperating with a respective cooling device and being adapted to pick a preform from a transfer wheel, release said preform alternately into one of said cooling tubes and pick said preform again to release it downstream of said rotary apparatus, said at least one picking and releasing device being adapted to translate upwards or downwards transversely to said radial direction by cooperating with said at least one fixed guide element during a rotation of the carousel.

Another aspect of the invention provides a production plant for producing preforms or containers made of thermoplastic material comprising the aforesaid rotary cooling apparatus, wherein said rotary cooling apparatus is arranged downstream of a rotary injection molding machine, and wherein a transfer wheel is provided between said rotary injection molding machine and said rotary cooling apparatus.

A further aspect of the invention relates to an operating method of the rotary cooling apparatus, wherein a transfer wheel is provided upstream of the rotary cooling apparatus, the method at full speed comprising, for each cooling device, the following steps during the rotation of the carousel:

a) providing preforms, or containers, to be cooled, introduced into respective cooling tubes, except for into a first tube provided in a receiving position of a first preform;
b) picking a first preform from the transfer wheel by means of a picking and releasing device, and releasing the first preform into said first tube;
c) translating the cooling device along the radial direction, in a first orientation or in a second orientation opposite to the first orientation, so that a second tube, preferably adjacent to the first tube, reaches said receiving position;
d) picking a second preform from said second tube by means of said picking and releasing device and releasing it downstream of the rotary cooling apparatus;
e) picking a new second preform from the transfer wheel by means of the picking and releasing device, and releasing the new second preform into said second tube;
f) repeating steps from c) to e) for a third tube and up to an nth tube of said plurality of cooling tubes adapted to cool from a third preform to an nth preform, respectively;
g) translating the cooling device along the radial direction, in said second orientation or first orientation, so that the first tube returns to said receiving position;
h) picking the first preform from said first tube by means of said picking and releasing device and releasing it downstream of the rotary cooling apparatus;
i) repeating steps from b) to h).

Advantageously, the solution of the invention allows:

increasing the productivity of the production plant for producing preforms by extracting the preforms or containers from the respective injection molding cavity at a higher temperature;

optimally controlling the shrinkage of the preforms or containers while avoiding bending or curvatures;

producing optimum quality preforms or containers with increased thickness;

processing a continuous flow of preforms or containers which allows an easy in-line quality control of the preforms themselves or the containers themselves, thus avoiding rejecting an entire set of molded preforms or containers in the event of defects in a single product.

The dependent claims describe preferred embodiments of the invention, thus forming an integral part of the present description.

BRIEF DESCRIPTION OF THE DRAWINGS

Further features and advantages of the invention will be more apparent in light of the detailed description of a preferred, but not exclusive, embodiment described according to an apparatus for producing plastic containers of the injection or injection-compression type, shown by way of non-limiting example, with the aid of the accompanying drawings, in which.

DETAILED DESCRIPTION OF A PREFERRED EMBODIMENT OF THE INVENTION

Figure 1:
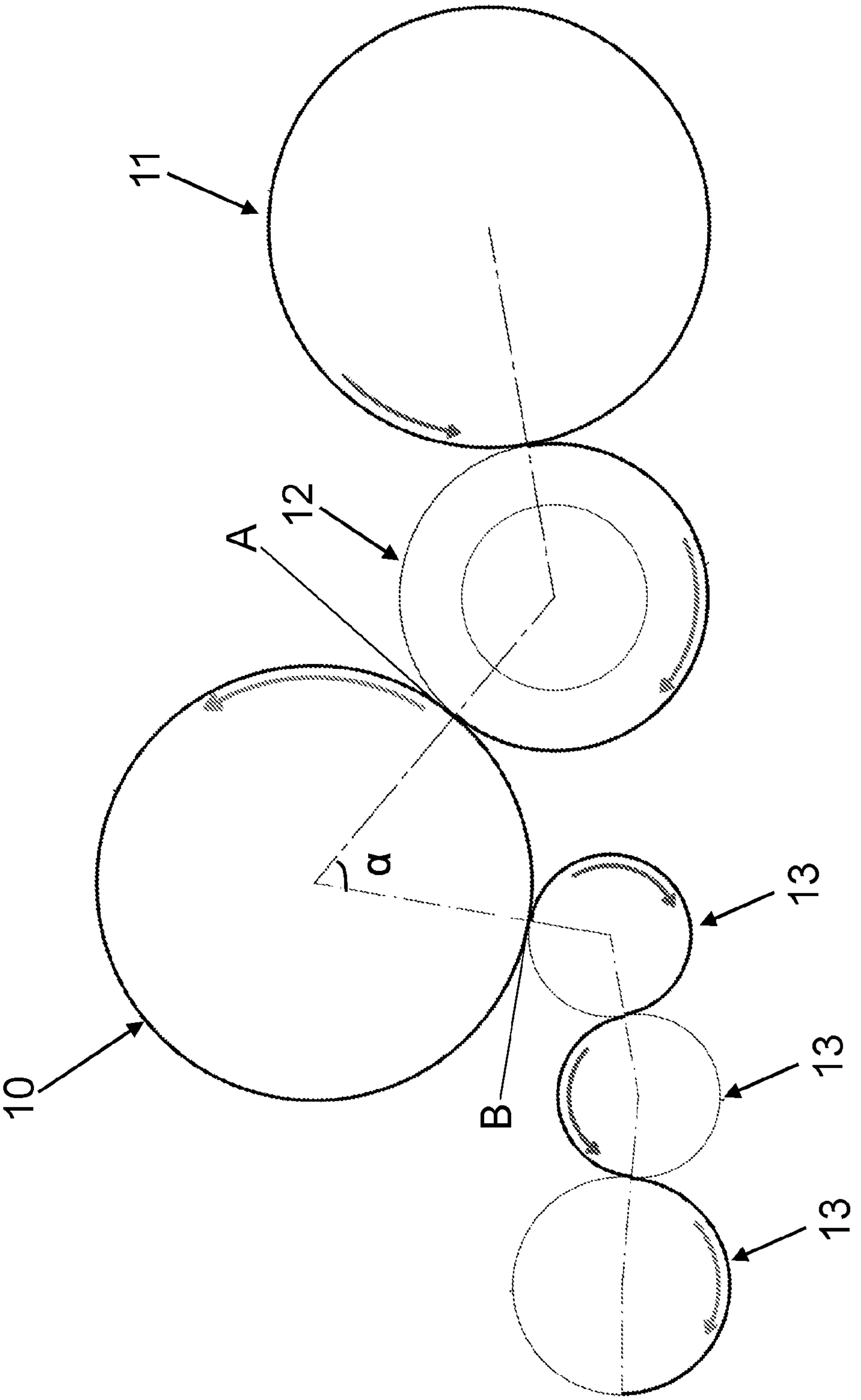
FIG. 1 shows a diagrammatic plan view of an example of production plant for producing preforms or containers made of thermoplastic in which a rotary cooling apparatus according to the invention is incorporated.
Figure 2:
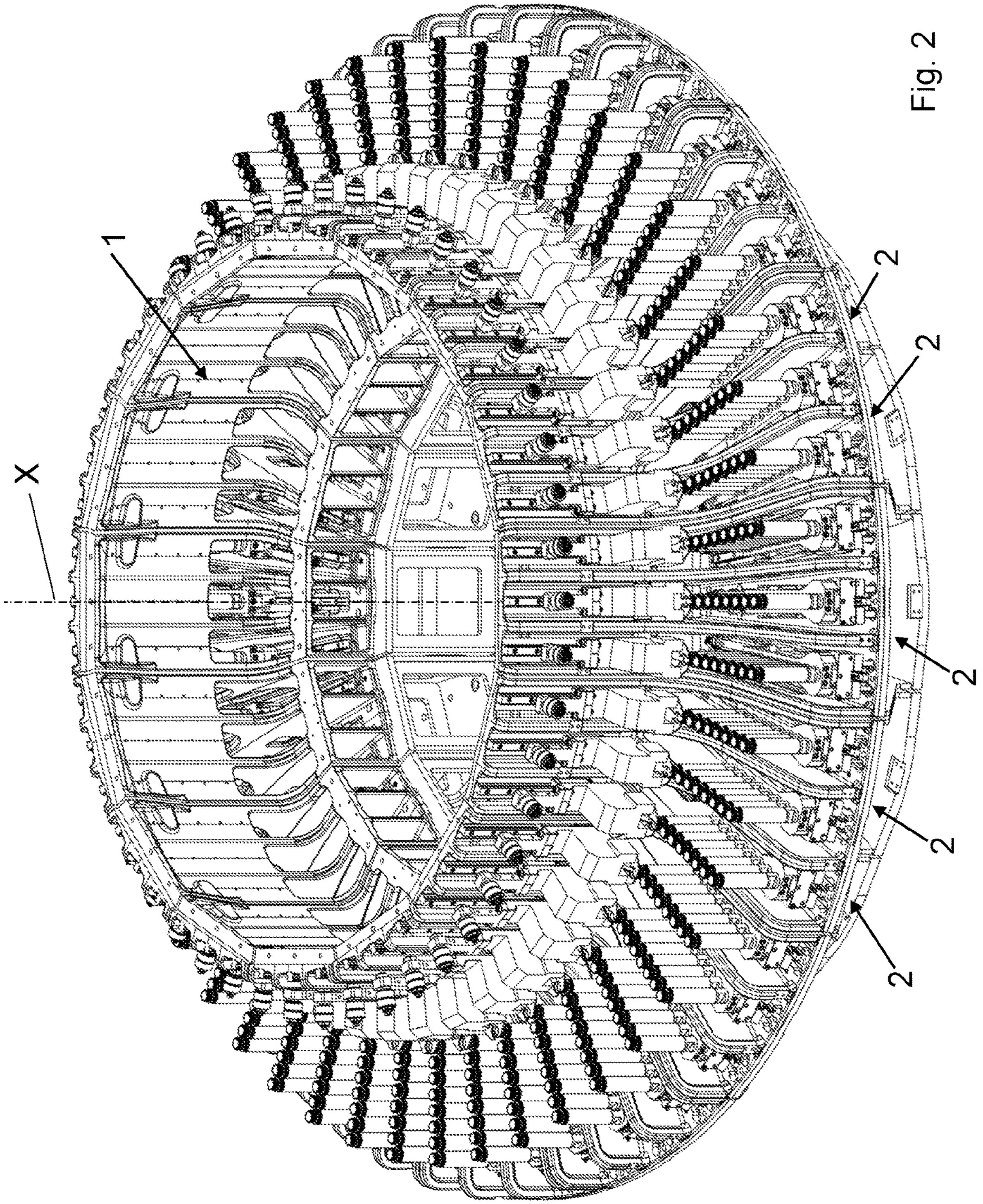
FIG. 2 shows an axonometric view of a rotary cooling apparatus of the invention.

With reference to FIG. 1, it is shown a production plant for producing preforms or containers, such as for example, test tubes, made of thermoplastic material, the plant comprising a rotary cooling apparatus 10 according to the invention.

The rotary cooling apparatus 10 is arranged downstream of a rotary injection molding machine 11, for example but not necessarily, a rotary injection-compression molding machine.

A transfer wheel 12 is provided between the rotary injection molding machine 11 and the rotary cooling apparatus 10. Any technical solution for unloading the cooled preforms or containers may be provided downstream of the rotary cooling apparatus 10. For example, one or more unloading wheels 13 may be provided, as shown in FIG. 1. The curvilinear arrows in FIG. 1 indicate rotation orientation of the various components of the production plant.

A linear type of unloading device or any other suitable unloading device, for example one or more containers for receiving the cooled products, can be provided as an alternative to the unloading wheels 13.

Figure 4:
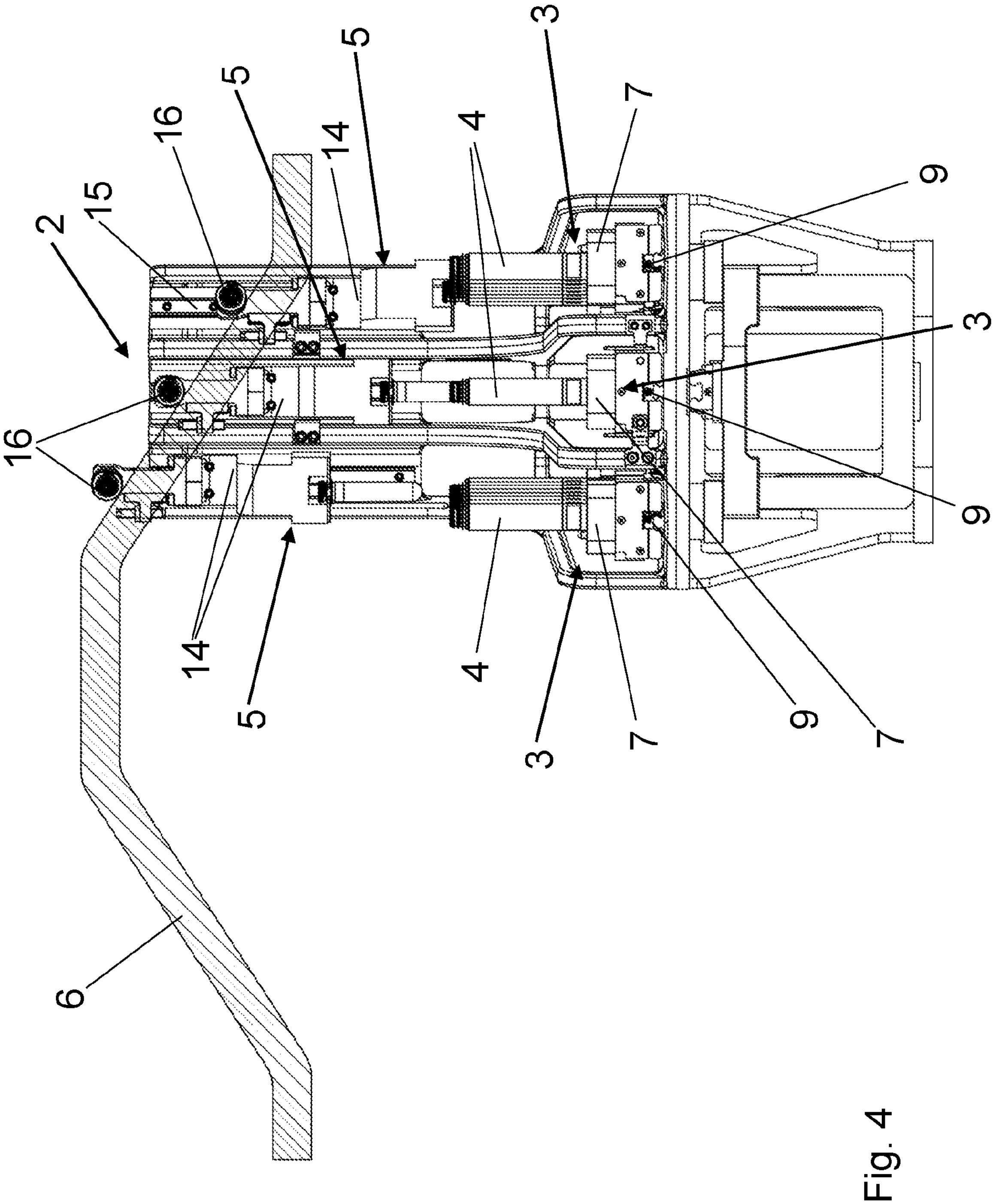
FIG. 4 shows a front view of the module in FIG. 3 and part of a guide element for adjusting the height of the picking and releasing devices.

Preferably, an optical control system of the individual preforms or of the individual containers downstream of the rotary cooling apparatus 10, is provided. In the specific example in FIG. 1, the three unloading wheels 13 downstream of the rotary cooling apparatus 10 are used to prepare such an optical control system of the individual preforms or of the individual containers. Thereby, a quality check of the individual preforms or of the individual containers can be performed in line, thus avoiding to discard a whole set of molded preforms or containers in the event of defects of an individual product, as occurs in the solutions of the background art. With reference to FIGS. 2 to 5, in all the embodiments thereof, the rotary cooling apparatus of the invention comprises:

a carousel 1 defining a circular periphery thereof and adapted to rotate about a substantially vertical rotation axis X;

at least one fixed guide element 6, for example a single guide element or cam, which is only partially shown FIG. 4, arranged along at least part of the periphery of carousel 1;

a plurality of cooling devices 3 radially arranged along the periphery of the carousel, each cooling device 3 being adapted to translate substantially horizontally along a radial direction with respect to the rotation axis X, and provided with a plurality of cooling tubes 4 arranged parallel to each other and in sequence along the radial direction and each adapted to receive a respective preform to be cooled;

a plurality of picking and releasing devices 5, each picking and releasing device 5 cooperating with a respective cooling device 3 and being adapted to pick a preform from the transfer wheel 12, release said preform alternately into one of said cooling tubes 4 and then pick the same preform again, once cooling is complete, to release it downstream of the rotary cooling apparatus 10, for example at an unloading wheel 13.

In particular, the guide element 6 may be a continuous or non-continuous annular element, that is an annular element which is closed or open in a portion thereof, concentric to carousel 1, and provided with areas at different heights.

The at least one picking and releasing device 5 is adapted to translate upwards or downwards transversely to the radial direction, for example perpendicularly to the radial direction, by means of the cooperation thereof with the fixed guide element 6 during the rotation of carousel 1.

For example, each picking and releasing device 5 comprises a support structure 14 which can slide along a substantially vertical guide 15 fastened to the structure of the carousel. Such a support structure 14 is provided, preferably at the upper end thereof, with a roller or lifter element 16 which, during the rotation of carousel 1, by sliding or following the guide element 6, causes the upwards or downwards translation of the corresponding picking and releasing device 5. The support structure 14 instead is provided with grippers 18, preferably at the lower end thereof. Optionally, at least one cooling device 3 and at least one corresponding picking and releasing device 5 are arranged, and therefore define, a cooling module 2 of the rotary cooling apparatus.

In the event of the presence of cooling modules 2, at least one guide 15 is fastened on each cooling module.

In the example in FIGS. 2 to 5, each cooling module 2 comprises three cooling devices 3 and three corresponding picking and releasing devices 5.

In other variants, less than three or more than three cooling devices 3 and respective picking and releasing devices 5 may be provided for each cooling module 2. A single cooling device 3 and a single corresponding picking and releasing device 5 may also be provided.

Figure 5:
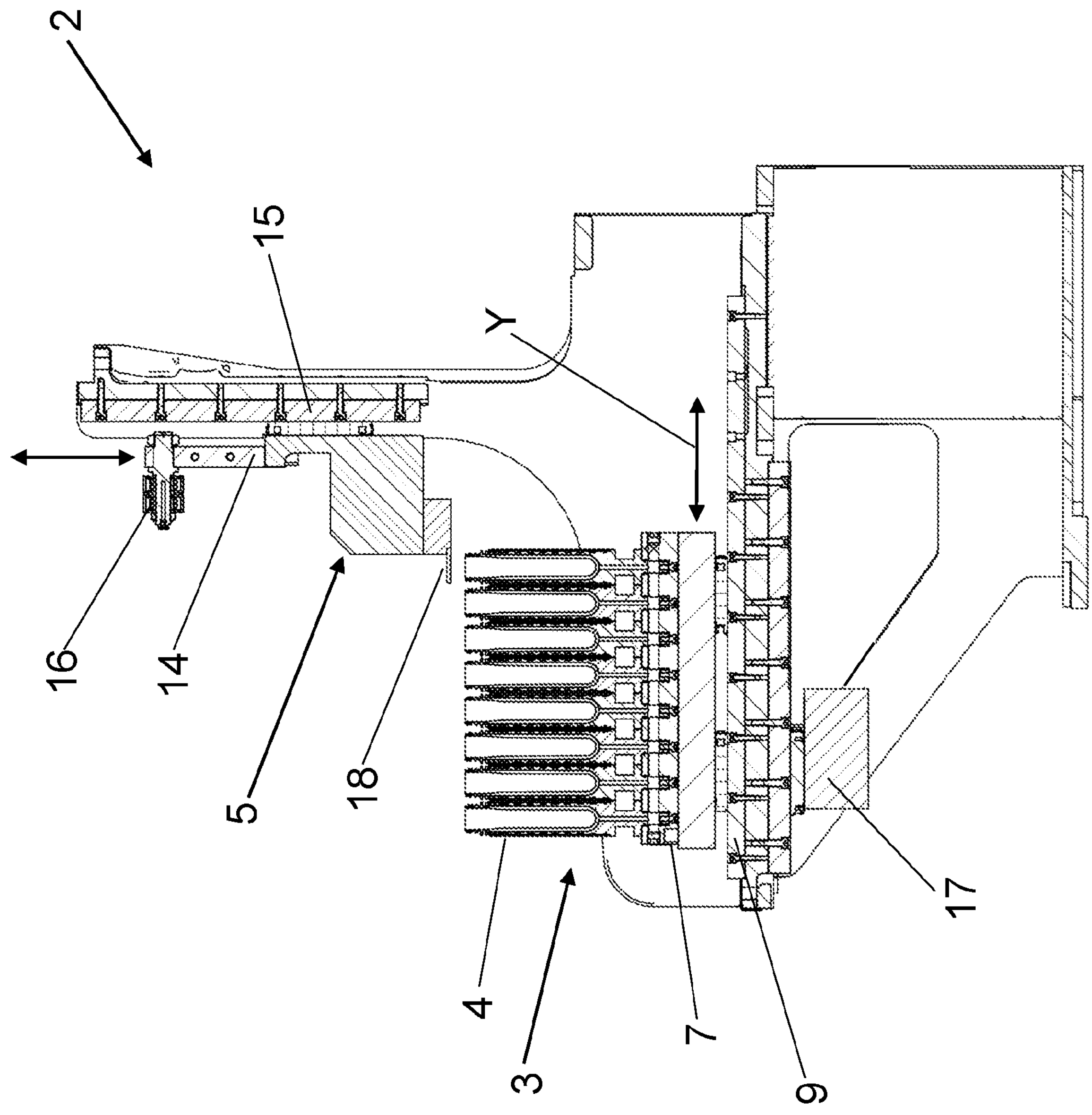
FIG. 5 shows a side sectional view of the module in FIG. 3.

As shown in the example in FIG. 5, at least one movement device 17 is provided, for example at least one motor with related transmission, adapted to impart, to a corresponding cooling device 3, the translation motion along the radial direction Y, in a first orientation or in a second orientation opposite to the first orientation, preferably but not necessarily equal to the pitch between one cooling tube and the one adjacent thereto.

Preferably, the plurality of cooling tubes 4 of each cooling device 3, which substantially are adjacent one with respect to the successive one along the radial direction, is arranged on a base 7 which slides on a guide 9 in turn integrally fastened to the cooling module 2.

Therefore, the movement device 17, for example at least one motor with related transmission, imparts the translation motion along the direction Y which is radial to base 7.

The cooling tubes 4 each define a substantially vertical axis thereof, which is perpendicular to the longitudinal axis defined by base 7.

Each cooling tube 4 is, for example, provided with an internal circuit for a cooling fluid, for example water, and with an air suction duct to facilitate the introduction of the preform into the cooling tube when released by the picking and releasing device 5.

The base 7 of each cooling device 3 is provided with channels for the cooling fluid which are connected to the internal circuit of each cooling tube, and is provided with a channel for the air connected to the suction duct of each cooling tube 4. In particular, at least one inlet channel and at least one outlet channel for the cooling fluid are provided in the base 7.

Below is a description of an operating method of the rotary cooling apparatus of preforms according to the invention, considering that a transfer wheel 12 is provided upstream of the rotary cooling apparatus 10 and an unloading wheel 13 is provided downstream of said rotary cooling apparatus 10. Containers, for example test tubes, may be cooled in place of the preforms.

As mentioned above, a linear type of unloading device or any other suitable unloading device, for example one or more containers for receiving the cooled products, may be provided as an alternative to the unloading wheel 13.

Figure 6:
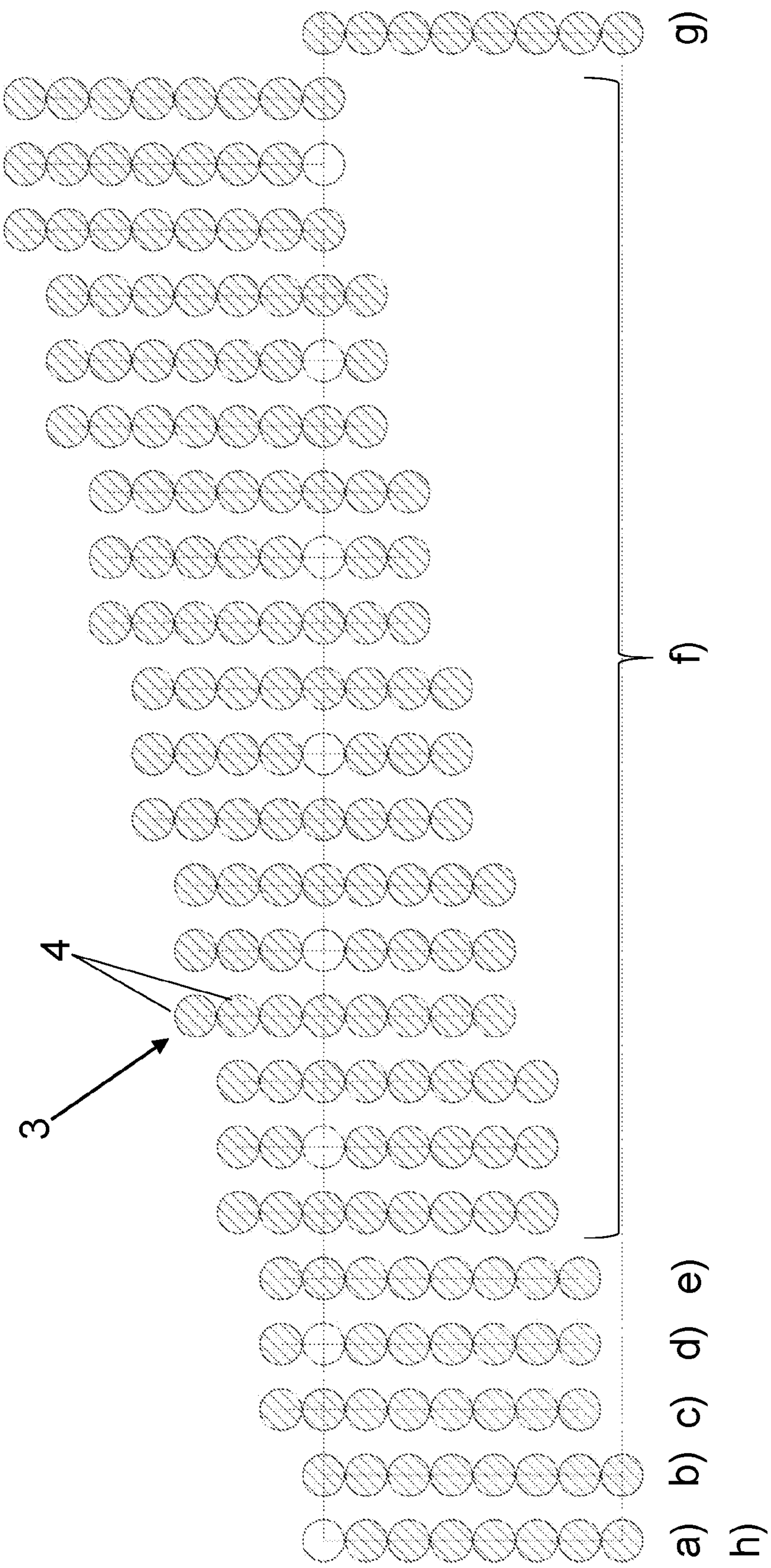
FIG. 6 shows a diagram of an operating cycle at full speed of the apparatus according to the invention.
Figure 7:
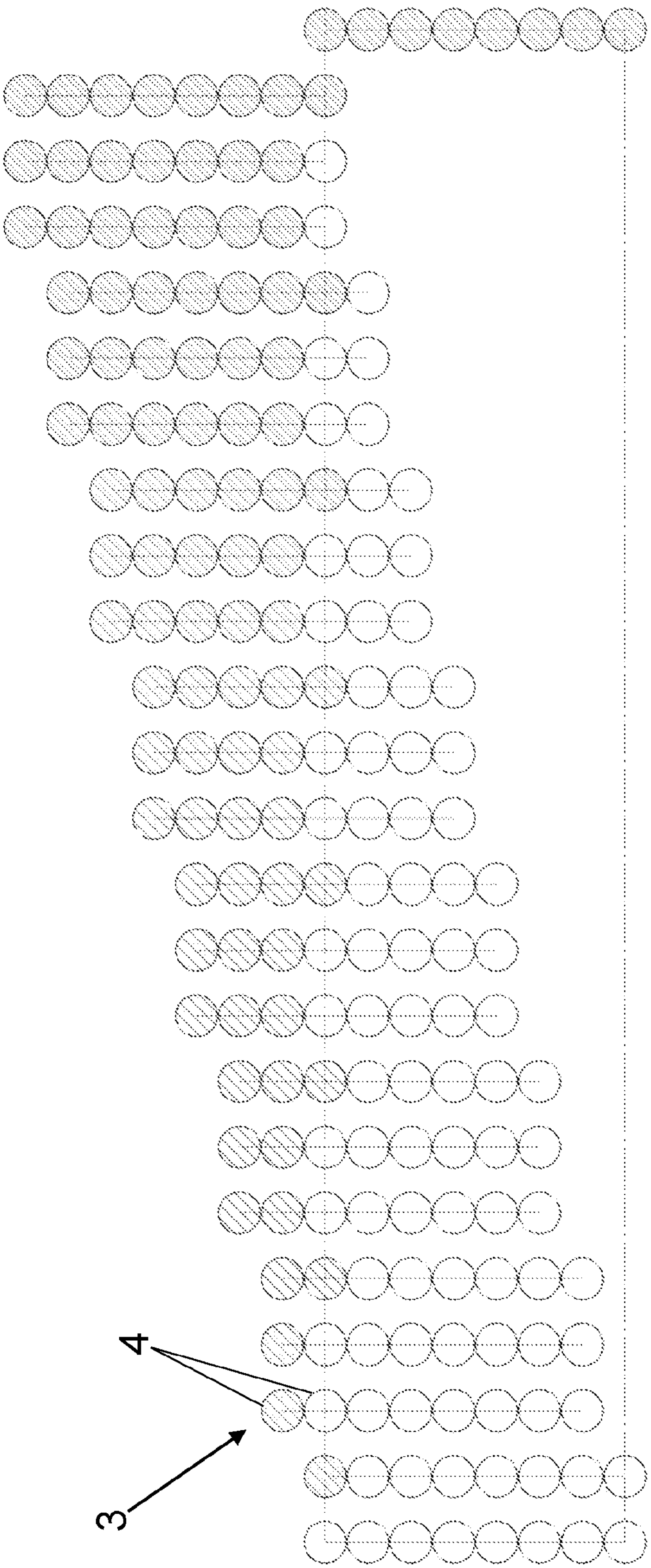
FIG. 7 shows a diagram of a starting step of the apparatus of the invention. The same reference numerals and letters in the drawings identify the same elements or components.

The cooling tubes 4 in FIGS. 6 and 7 containing a respective preform therein are indicated by a lined background, while the empty cooling tubes are indicated with no background.

Figure 3:
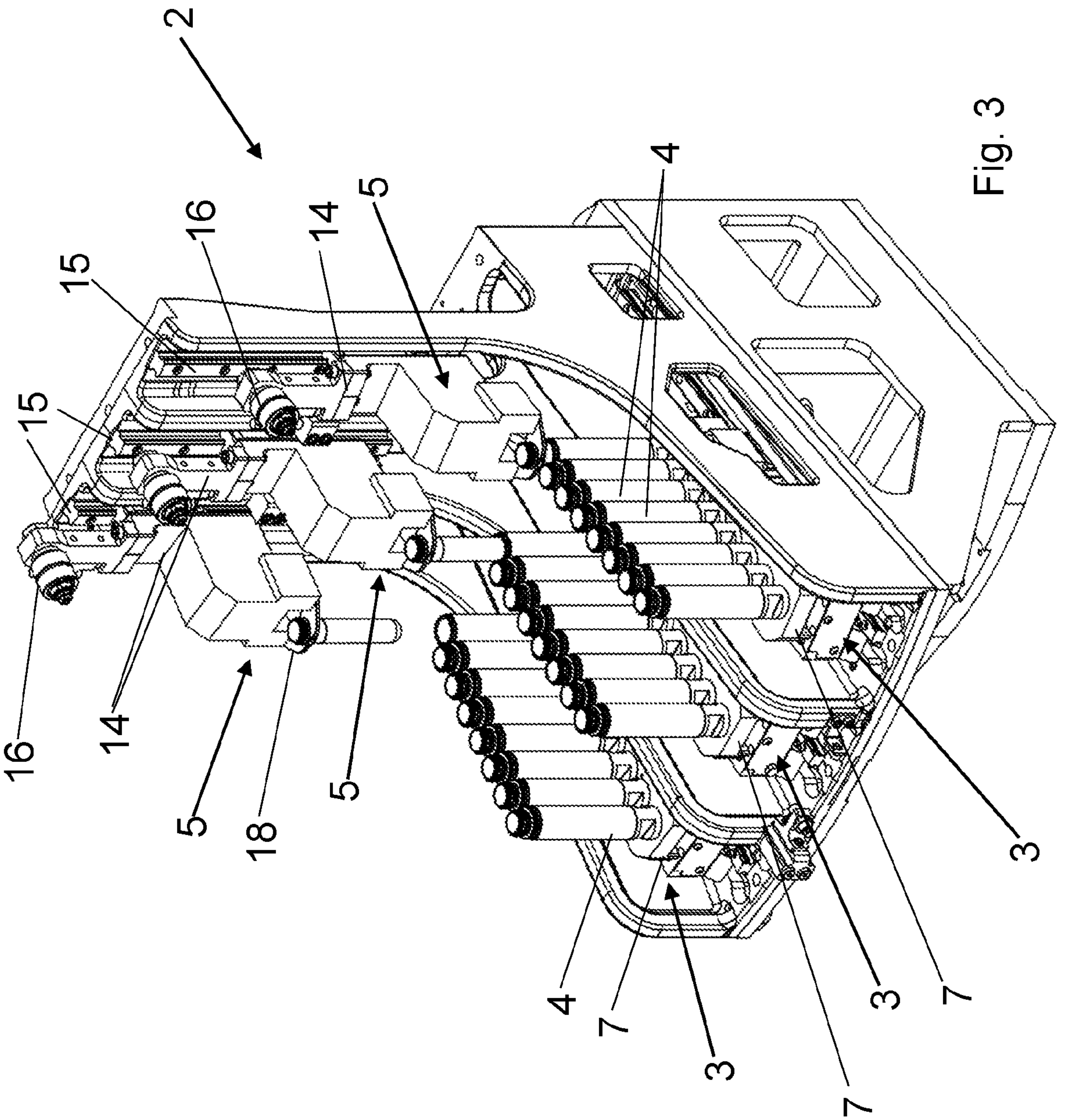
FIG. 3 shows an axonometric view of a module of the rotary cooling apparatus in FIG. 2.

The operating method at full speed of the rotary cooling apparatus 10 comprises, for each cooling device 3, during the rotation of carousel 1, the following steps (FIG. 6):

a) providing preforms to be cooled, introduced into all the respective cooling tubes 4, except for into a first tube provided in a receiving position of a first preform (see for example FIG. 3);

b) picking a first preform from the transfer wheel 12 by means of a picking and releasing device 5, and releasing the first preform into the first tube;

c) translating the cooling device 3 along the radial direction, in a first orientation or in a second orientation opposite to the first orientation, so that a second tube, preferably but not necessarily adjacent to the first tube, reaches the receiving position;

d) picking a second preform from the second tube by means of the picking and releasing device 5 and releasing it, downstream of the rotary cooling apparatus, to the unloading wheel 13;

e) picking a new second preform from the transfer wheel 12 by means of the picking and releasing device 5, and releasing the new second preform into said second tube, still in the receiving position;

f) repeating steps from c) to e) for the third tube and up to an nth tube of the plurality of tubes adapted to cool from a third preform to an nth preform, respectively (only by way of example, from 3 to 10 cooling tubes may be provided in the cooling device 3, for example 8, as shown in Figures from 2 to 7);

g) translating the cooling device 3 along the radial direction, in said second orientation or first orientation, so that the first tube returns to said receiving position;

h) picking the first preform from said first tube by means of the picking and releasing device 5 and releasing it to the unloading wheel 13;

i) repeating steps from b) to h).

Receiving position means the position of the cooling tube below the corresponding picking and releasing device 5, in particular the position of the cooling tube 4 when the latter is coaxial to the area enclosed by the grippers 18, in closed position, of the picking and releasing device 5.

The picking from the transfer wheel 12 and the releasing into the cooling tubes 4, for example from the first to the nth tube, of the respective preforms to be cooled, are provided in a starting step of the apparatus of the invention, which precedes the operation at full speed. An example of this starting step is shown in FIG. 7.

Preferably, picking the preforms, or the containers, from the transfer wheel 12 occurs at a first height; releasing the preforms into the respective cooling tubes 4 occurs at a second height, lower than the first height; picking the preforms from the respective cooling tube 4 occurs at a third height, lower than or equal to the second height; and releasing the preforms to the unloading wheel 13, or other suitable unloading device, occurs at a fourth height, higher than the second height. The first height and the fourth height may be equal to each other.

With reference to the plant in FIG. 1, each preform is gripped by the transfer wheel 12 by means of a respective picking and releasing device 5 at point A. After the preform is released into the corresponding tube 4 of the respective cooling device 3 (step b), and after some revolutions of the rotary apparatus 10 in which the cooling of the aforesaid preform is completed and steps c) to g) are performed, the preform is grasped again by the same picking and releasing device 5 which removes it from the tube and releases it downstream of the rotary cooling apparatus 10 at point B (step h).

The picking and releasing devices 5 are always free of preforms in stretch AB of the rotary apparatus 10 defining an acute central angle α. At full speed operation, each cooling device 3 in this stretch AB has only one empty cooling tube.

The invention claimed is:

1. A rotary cooling apparatus for cooling preforms or containers made of thermoplastic material, comprising:

a carousel having a periphery thereof and adapted to rotate about a substantially vertical rotation axis X;

at least one fixed guide element arranged along at least part of said periphery;

a plurality of cooling devices radially arranged along the periphery of the carousel, each cooling device being adapted to substantially horizontally translate along a radial direction with respect to said rotation axis X, and provided with a plurality of cooling tubes arranged in sequence along said radial direction and adapted to each receive a respective preform to be cooled;

a plurality of picking and releasing devices, each picking and releasing device cooperating with a respective cooling device and being adapted to pick a preform from a transfer wheel, release said preform alternately in one of said cooling tubes and pick said preform again to release it downstream of said rotary cooling apparatus, each picking and releasing device being adapted to translate upwards or downwards transversely to said radial direction by cooperating with said at least one fixed guide element during a rotation of the carousel;

wherein at least one cooling device and at least one corresponding picking and releasing device define a cooling module of said rotary cooling apparatus;

wherein the apparatus includes a plurality of said cooling module, wherein each cooling module comprises one, two, three or more cooling devices and corresponding one, two, three or more picking and releasing devices.

2. The apparatus according to claim 1, wherein a movement device is provided, adapted to impart a translation motion along said radial direction to said respective cooling device, in a first orientation or in a second orientation opposite to the first orientation, equal to the pitch between one cooling tube and another cooling tube adjacent thereto of said respective cooling device.

3. The apparatus according to claim 1, wherein each picking and releasing device is adapted to translate perpendicularly to said radial direction.

4. The apparatus according to claim 1, wherein said plurality of cooling tubes is arranged on a sliding base adapted to slide on at least one guide, fastened on a structure of the carousel.

5. The apparatus according to claim 4, wherein each cooling tube is provided with an internal circuit for a cooling fluid and with an air suction duct to facilitate an introduction of the preform into the cooling tube, and wherein said sliding base is provided with channels for the cooling fluid connected to the internal circuit of each cooling tube, and is provided with a channel for the air connected to the suction duct of each cooling tube.

6. A plant for manufacturing preforms or containers made of thermoplastic material, comprising a rotary cooling apparatus according to claim 1, wherein said rotary cooling apparatus is arranged downstream of a rotary injection molding machine, and wherein said transfer wheel is provided between said rotary injection molding machine and said rotary cooling apparatus.

7. An operating method of a rotary cooling apparatus according to claim 1, wherein said transfer wheel is provided upstream of the rotary cooling apparatus, the method at full speed comprising, for each cooling device, the following steps during the rotation of the carousel:

a) providing preforms, or containers, to be cooled, introduced in respective cooling tubes, except for in a first tube provided in a receiving position of a first preform;

b) picking the first preform from the transfer wheel by means of a respective picking and releasing device, and releasing the first preform into said first tube;

c) translating the cooling device along the radial direction, in a first orientation or in a second orientation opposite to the first orientation, so that a second tube, adjacent to the first tube, reaches said receiving position;

d) picking a second preform from said second tube by means of said respective picking and releasing device and releasing it downstream of the rotary cooling apparatus;

e) picking a new second preform from the transfer wheel by means of said respective picking and releasing device, and releasing the new second preform into said second tube;

f) repeating steps c) to e) for a third tube and up to an nth tube of said plurality of cooling tubes adapted to cool from a third preform to an nth preform, respectively;

g) translating the cooling device along the radial direction, in said second orientation or first orientation, so that the first tube returns to said receiving position;

h) picking the first preform from said first tube by means of said respective picking and releasing device and releasing it downstream of the rotary cooling apparatus;

i) repeating steps b) to h).

8. The method according to claim 7, wherein picking the preforms from the transfer wheel occurs at a first height; releasing the preforms into the respective cooling tubes occurs at a second height, lower than the first height; picking the preforms from the respective cooling tube occurs at a third height, lower than or equal to the second height; and releasing the preforms downstream of the rotary cooling apparatus occurs at a fourth height, higher than the second height.

* * * * *